United States Patent [19]
Hillman

[11] 3,867,067
[45] Feb. 18, 1975

[54] WIND POWERED MOTIVE APPARATUS

[76] Inventor: Edwin K. Hillman, 907 W. Desert Cove Rd., Phoenix, Ariz. 85029

[22] Filed: Sept. 6, 1973

[21] Appl. No.: 394,786

[52] U.S. Cl. .................................................. 416/10
[51] Int. Cl. ............................................... F03b 7/00
[58] Field of Search ........................... 416/9–11, 2, 416/110–111, 117–119; 415/2

[56] References Cited
UNITED STATES PATENTS

| | | | |
|---|---|---|---|
| 951,899 | 3/1910 | Baldwin | 416/117 X |
| 1,516,668 | 11/1924 | Burch | 416/118 |
| 1,707,507 | 4/1929 | Burch | 416/117 |
| 1,809,919 | 6/1931 | Turner | 416/117 |

FOREIGN PATENTS OR APPLICATIONS

| | | | |
|---|---|---|---|
| 1,038,090 | 5/1953 | France | 416/11 |
| 384,349 | 11/1923 | Germany | 415/2 |
| 135,568 | 0/1919 | Great Britain | 416/11 |
| 258,955 | 0/1926 | Great Britain | 416/9 |

*Primary Examiner*—Everette A. Powell, Jr.

[57] ABSTRACT

Apparatus is disclosed for harnessing the wind to drive a rotating shaft unto which is secured a pulley. The apparatus is mounted upon a vertical mast that is able to rotate, to place it substantially above ground level to take full advantage of the wind gradient. The vaned structure includes a plurality of reciprocally pivotable centrally mounted members. The extremities of each of these members support a vane. The two vanes of each member are set at right angles with respect to one another. In operation, the wind will engage both vanes of separate members. As the vanes are engaged, the force of the wind will tend to rotate the members. Rotation of the members will cause the engaged vanes to pivot directly into the force of the wind. The upward rotation of the vanes will pivot the other vanes whereby the other vanes are parallel with the force of the wind. The disparate wind force on each of the opposed vanes on any given member will tend to cause the members to rotate about its mounting point. The rotation of the members about its mounting point will cause the shaft itself to rotate. As the mount is secured to a vertical mast that is able to rotate, and the output shaft is mounted and supported from this mast, the shaft will be actuated by wind power. With the above described apparatus, all the power generated by the primary apparatus is converted to usable power at the output shaft. The output shaft has a pulley secured to it to distribute power in a conventional way.

8 Claims, 6 Drawing Figures

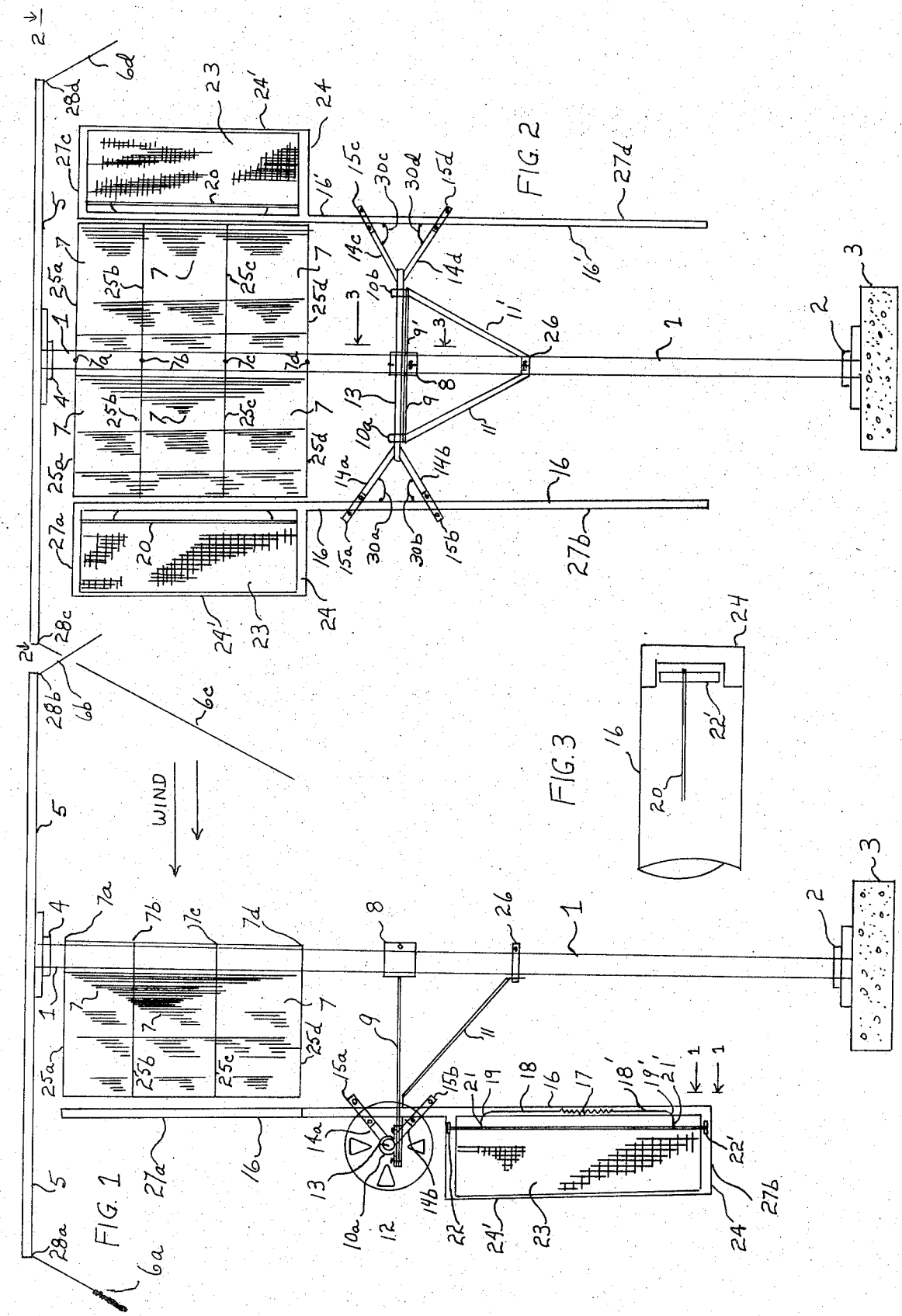

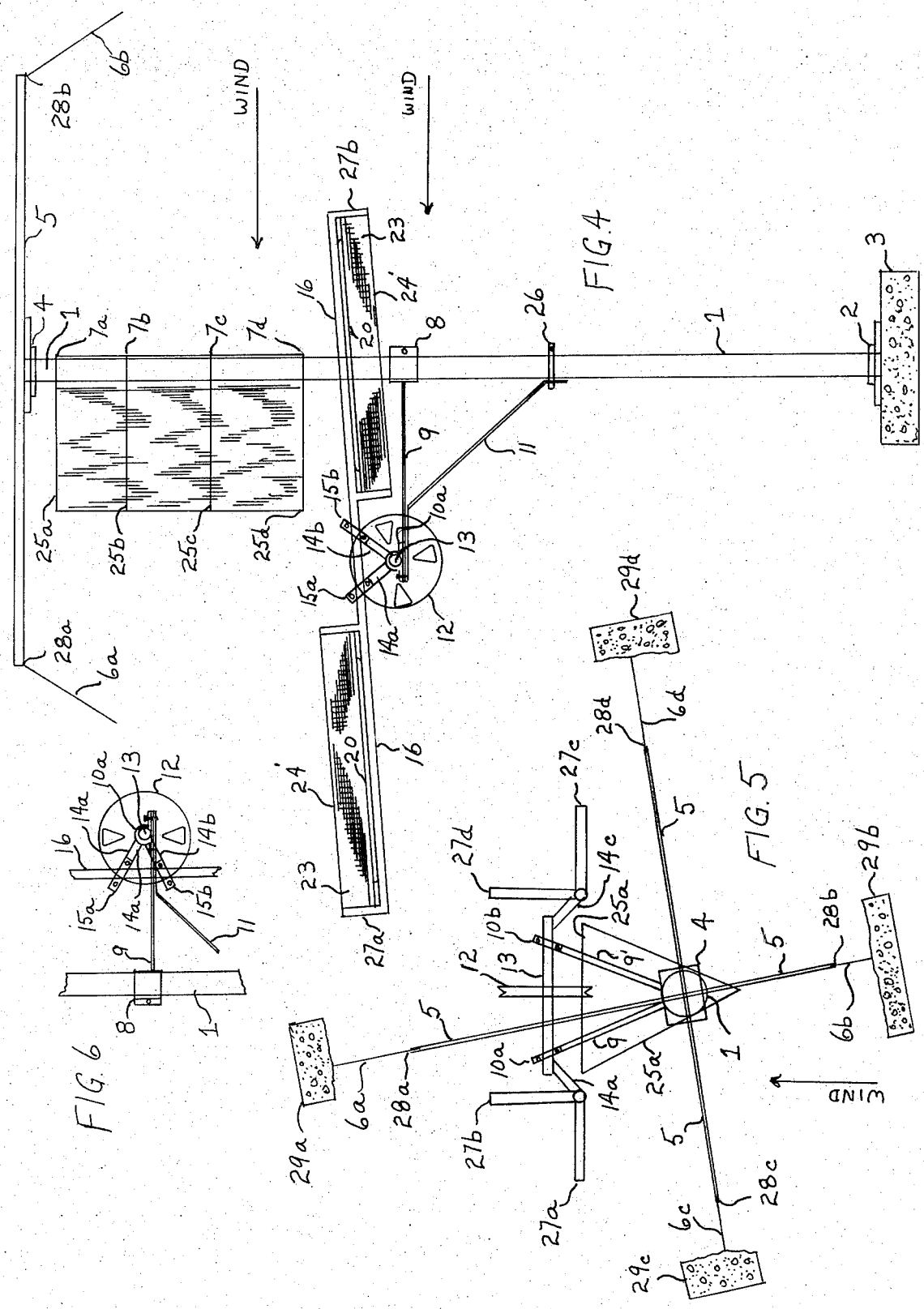

WIND POWERED MOTIVE APPARATUS

The present invention relates to apparatus for harnessing the force of the wind, and more particularly, to apparatus presenting a constantly varying surface area for engaging the wind.

Various devices have been used for many years to harness the energy available from the wind. One of the most common of these devices is that of a fan-mounted upon a derrick, generally referred to as a windmill. Usually, the fan includes a rudder-like member for positioning the fan normal to the eye of the wind. The structure and configuration of the fan are such that it is primarily intended for low rotational speed operation. The low rotational speed and high torque output lends this type of apparatus to be particularly suitable for connection to a reciprocating water pump. When so used, it is usually located at remote water holes for supplying water to cattle or other livestock. One of the primary disadvantages of this type of apparatus is that severe damage may occur to the fan or the operating mechanism during high wind conditions. Because of this disadvantage, the rudder-like mechanism is usually manually pivotable so as to align the fan with the wind and thereby prevent the wind from causing the fan to rotate. To be effective, the apparatus must, of course, be within easy access to the operator and such is not often the case at remote locations.

Another distinct type of wind-driven apparatus is that in which the operative element rotates on a vertical axis. Generally, this type of apparatus includes a plurality of arms extending in a horizontal plane. A cup-like shaped wind engaging device is secured to the extremity of each arm. The devices are similarly oriented at the extremities of the arms with the result being that of one-half of the apparatus presenting a greater resistance to the wind than the other half. The disparate resistance to the wind causes the wind to react more strongly on one half of the apparatus than the other. The unequal reaction, in turn, causes the apparatus to rotate about its vertical axis. A typical example of this type of device is a wind speed measuring device known as an anemometer.

Variations on the above discussed types of wind-driven apparati have also been developed. One of the most notable developments is that of a device functioning similarly to an anemometer but having its arms either curved or dished whereby the wind coacts with one half of the apparatus with greater force than the other half. However, each of these types of apparatus include non-varying surface area elements extending from a hub, whether that hub be in the vertical or horizontal axis.

It is therefore a primary object of the present invention to provide a variable surface wind responsive power generator.

Another object of my invention is to provide a means for varying the area of the surfaces subjected to the force of the wind as a function of the rotational position of the power output shaft.

A yet another object of the present invention is to provide a means for orienting the power generator with respect to the eye of the wind.

A still another object of the present invention is to provide means which deflect the force of the wind into the surface of the vanes at most appropriate time for increased power performance.

A further object of the present invention is to provide reciprocally pivoting vanes for varying the surface area engaging the wind.

A yet further object of the present invention is to provide means for controlling the movement of the vanes by stops to fully utilize all the wind power available at the time the vanes are actuated by wind power.

A still further object of the present invention is to provide a variable camber vane, which camber is a function of the force of the wind.

These and other objects of the invention will become more readily apparent to those skilled in the art as the description thereof proceeds.

The present invention may be described with more specificity and clarity with reference to the following drawings, in which:

FIG. 1 illustrates a cross-sectional view of the present invention in a vertical position with its base secured to concrete.

FIG. 2 illustrates a cross-sectional view of the present invention with vane members in their most efficient mode of operation.

FIG. 3 illustrates a cross-sectional view taken along lines 1—1 as shown in FIG. 1;

FIG. 4 illustrates a cross-sectional view of the present invention showing the force of the wind acting on vane members.

FIG. 5 illustrates a top view taken along lines 2—2 as shown in FIG. 2;

FIG. 6 illustrates a cross-sectional view taken along lines 3—3 as shown in FIG. 2;

Assuming for the moment that the wind is blowing in the direction shown in FIG. 1, the wind will strike Vanes 27a and 27b, which vanes are interconnected by a Common Pipe 16. As Vane 27a is oriented perpendicular to the wind and as Vane 27b is aligned with the wind, the wind will produce a greater force upon Vane 27a than Vane 27b. The disparity of forces will tend to produce rotation of the interconnected vanes in a counterclockwise direction about the pivot point represented by Shaft 13. In addition, the force acting upon Flexible Material 23 will tend to rotate the interconnected vanes about the longitudinal axis of Common Pipe 16. Thereby, Vanes 27a and 27b will rotate about both Shaft 13 and Common Pipe 16 simultaneously. The dual rotation of the vanes will cyclically force Vanes 27a and 27b into a broadside or near broadside configuration in proximity to Deflector 7.

A stalled condition, that is, both Vanes 27a and 27b presenting an equal frontal area to the wind, is prevented by Deflector 7. As illustrated in FIG. 5, Deflector 7 is triangular shaped with an apex oriented into the wind. The wind, in striking the side of Deflector 7 in proximity to the rotating Vanes 27a and 27b, will produce a lateral deflection of the wind. The lateral deflection of the wind will produce a lateral force component upon the periodically adjacent vane. The disparity of lateral forces acting upon opposed Vanes 27a and 27b will prevent both vanes from presenting an equal surface area to the wind. Hence, a stalled condition is avoided.

As may be observed from FIGS. 1, 2 and 5, the individual Vanes 27a and 27b cyclically rotate through adjacent quadrants, which quadrants are lateral to Deflector 7. The rotational limits of the pairs of vanes are defined by Stop Links 30a, 30b, 30c, and 30d, which are described in further detail below.

This rotational power of Vanes 27a and 27b is then transmitted by means of Common Pipe 16, by means of Bearing 15a and Bearing 15b and V-support members 14a and V-Support Member 14b to Shaft 13.

The Flexible Material 23 of Vane 27a is attached along one longitudinal edge to Frame 24' and along another longitudinal edge to Rod 20. The ends of Rod 20 are supported by a pair of wheels 22 and 22', which wheels are free to travel within the confines of Frame 24, as shown in FIG. 3.

The spacing between Rod 20 and Frame 24' defines the camber of Flexible Material 23, which camber is induced by the impinging wind. Rod 20 is biased toward Common Pipe 16 by Spring 17 and Cables 18 and 18', whereby the maximum area of Flexible Material 23 is presented to the wind commensurate with the force of the wind. Each of these Cables 18 and 18' extend through Aperature 19 and Aperature 19' and are secured to Rod 20 at Point 21 and Point 21' by conventional means.

In further discussion and referring to FIG. 1, with the base of Mast 1 secured to Flange Bearing 2 and Flange Bearing 2 secured to Concrete 3 by conventional means and the other extremity of Mast 1 secured to Flange Bearing 4 provides the means for Mast 1 to rotate. Cross-Member 5 is secured to Flange Bearing 4 by conventional means. Two of the four Cables 6a and 6b are secured to Cross-Member 5 at Points 28a and 28b causing Mast 1 to attain a vertical position. The use of Flange Bearing 2 and Flange Bearing 4 make it possible for Mast 1 to rotate in its vertical axis.

Further discussion and referring to FIG. 2, with the wind blowing, the force of the wind acting upon Air-Foil Deflector 7 will cause Mast 1 to turn to the proper relation with respect to the wind direction. Air-Foil Deflector 7 has two main purposes to accomplish, cause Mast 1 to rotate into proper relation with the wind and also deflect wind velocity into the surface area of Vane 27a, Vane 27b, Vane 27c and Vane 27d when Vanes 27a, 27b, 27c and 27d are in their respective upright vertical position. Air-Foil Deflector 7 could be constructed of light weight panels with rigidity or with the use of materials that are flexible.

Assuming the wind is still blowing in FIG. 2. Air-Foil Deflector 7 has caused Mast 1 to turn to proper position because Air-Foil Deflector is shaped as a "V" with the point of the "V" pointing into the wind force thereby orientating Mast 1. The wind now will act upon Vanes 27a, 27b, 27c, and 27d causing Vanes 27a, 27b, 27c and 27d to rotate about its axis which is Shaft 13. Vanes 27a, 27b, 27c, and 27d are able to reciprocate and pivot because by means of Common Pipe 16 which is secured to Bearings 15a, 15b and Bearing 15c and Bearing 15d, which bearings are secured to the extremities of V-Support Members 14a, 14b, V-Support Member 14c and V-Support Member 14d by conventional means. Shaft 13 and V-Support Members 14a, 14b, 14c and 14d are constructed as a one-piece unit. Shaft 13 is able to rotate by means of Bearing 10a and Bearing 10b.

To control the movement of Vanes 27a, 27b, 27c and 27d in their pivoting action, Flexible Stop Link 30a, Flexible Stop Link 30b, Flexible Stop Link 30c and Flexible Stop Link 30 d are secured to V-Support Members 14a, 14b, 14c and 14d and the other end of Flexible Stop Links 30a, 30b, 30c and 30d are secured to Common Pipe 16 so that the movement of Common Pipe 16 is limited to a 90° angle in its pivoting action. Flexible Stop Links 30a, 30b, 30c and 30d are secured to V-Support Members and Common Pipe 16' by conventional means. Flexible Stop Links 30a, 30b, 30c and 30d can be made of almost any material that is strong enough to withstand the continuous movement of Common Pipes that pivots when the wind blows.

Further discussion and referring to FIG. 4, the wind blowing in the direction shown, Vane 27b has almost completed its reciprocating action and presented its full surface area of Flexible Material 23 to the force of the wind. The force of the wind will cause Vanes 27b and 27a to rotate. Vane 27b will reach its upright vertical position with respect to Air-Foil Deflector 7, which is supported in its position by Air-Foil Deflector Support 25a, Air-Foil Deflector Support 25b, Air-Foil Deflector Support 25c and Air-Foil Deflector Support 25d, which are constructed in the shape of a triangle and secured to Mast 1 by conventional means at Point 7a, Point 7b, Point 7c and Point 7d.

Referring to FIG. 2, Clamp 8 is secured to Mast 1 by conventional means and Support 9 and Support 9' which are an intregal part of Clamp 8 and supports the weight of the entire Vane assembly and at the extremity of Supports 9 and 9', Bearing 10a and Bearing 10b are secured to Supports 9 and 9' by conventional means. Support 11 and Support 11' tend also to support the vane apparatus. Clamp 26 secures 11 and 11' to Mast 1 by conventional means.

Further discussion and referring to FIG. 5, to stabilize the entire structure Cable 6a, Cable 6b, Cable 6c and Cable 6d are secured by conventional means to Cross-Member 5 at Point 28a, Point 28b, Point 28c and Point 28d and the other end of Cables 6a, 6b, 6c, and 6d are secured by conventional means to Concrete 29a, Concrete 29b, Concrete 29c and Concrete 29d at ground level thus making it possible for Mast 1 to rotate in Bearing 2 and Bearing 4.

From the above descriptions it can be readily seen that the entire power output of the apparatus can be taken off Pulley 12 and used for various purposes and including the generation of electrical energy.

Although the movement and function of only a single vane of one pair of vanes has been described in detail, it is to be understood that each vane of each pair of vanes operates in a similar fashion.

It is also to be understood that Vanes 27a and 27c act in unison in their movements and likewise Vanes 27b and 27d.

In the event of high wind conditions the flexible material used in the Vanes and also of the Air-Foil Deflector could be of such a nature that the flexible material would literally tear apart thereby causing the apparatus to not function. After the high winds subsided it would be necessary to replace the flexible material, a small cost relative to the entire cost.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

Having thus completely and fully described the invention, what is now claimed is as follows:

1. A wind operated apparatus having a rotatable output shaft, said apparatus comprising:
   a. a mast, said mast being pivotally mounted;
   b. a triangular shaped deflector, said deflector being rigidly attached to said mast, said deflector in combination with said mast being pivotally responsive to any changes in the direction of the wind to orient an apex of said deflector into the wind, whereby the lateral sides extending from the apex laterally deflect the wind;
   c. support means attached to said mast and extending laterally therefrom;
   d. said output shaft being rotatably mounted upon said support means normal to a plane bisecting the apex of said deflector, said output shaft extending beyond opposed sides of said deflector; and
   e. a plurality of vane means displaced from one another and extending from said shaft, each said vane means including:
      1. a common pipe affixed at its center to said shaft and extending laterally therefrom;
      2. a pair of vanes having one vane secured to each extending part of said common pipe, one vane of said pair of vanes being oriented at right angles to the other vane;
      3. bearing means disposed at the junction of said shaft and said common pipe to rotatably journal said common pipe; and
      4. means for limiting rotational movement of said pair of vanes within a 180° arc facing away from said deflector;
   f. power take off means attached to said output shaft; whereby, said deflector aligns said vane means for rotation within a plane parallel to the wind, each said vane means presenting an asymmetrical surface area to the wind to induce rotation of said output shaft, said deflector further producing a lateral component to a part of the wind acting upon said vane means to prevent a stalled condition of said vane means.

2. The apparatus as set forth in claim 1 wherein said mast is retained upright by a ground based flange bearing and a guyed cross member.

3. The apparatus as set forth in claim 2 wherein said pairs of vanes and said interconnecting output shaft are mounted downwind of the apex of said deflector.

4. The apparatus as set forth in claim 3 wherein said deflector is mounted above said support means.

5. The apparatus as set forth in claim 1 wherein each of said vanes includes a flexible material mounted within a frame.

6. The apparatus as set forth in claim 5 further including a positionable rod, said flexible material being attached to said rod and one side of said frame parallel to said rod, whereby any camber of said flexible material which is induced by the wind is accommodated by repositioning of said rod.

7. The apparatus as set forth in claim 6 including bias means attached to said rod for biasing said rod away from said one side of said frame to retain said flexible material taut commensurate with the force of the wind.

8. The apparatus as set forth in claim 1 wherein said power take off means comprises a pully mounted on said output shaft.

* * * * *